(12) United States Patent
Shiran et al.

(10) Patent No.: US 11,144,548 B2
(45) Date of Patent: Oct. 12, 2021

(54) OPTIMIZED DATA STRUCTURES OF A RELATIONAL CACHE WITH A LEARNING CAPABILITY FOR ACCELERATING QUERY EXECUTION BY A DATA SYSTEM

(71) Applicant: Dremio Corporation, Santa Clara, CA (US)

(72) Inventors: Tomer Shiran, Mountain View, CA (US); Jacques Nadeau, Santa Clara, CA (US); Steven Michael Phillips, Mountain View, CA (US)

(73) Assignee: DREMIO CORPORATION, Santa Clara, CA (US)

( * ) Notice: Subject to any disclaimer, the term of this patent is extended or adjusted under 35 U.S.C. 154(b) by 239 days.

(21) Appl. No.: 16/392,483

(22) Filed: Apr. 23, 2019

(65) Prior Publication Data

US 2019/0324964 A1   Oct. 24, 2019

Related U.S. Application Data

(60) Provisional application No. 62/662,015, filed on Apr. 24, 2018.

(51) Int. Cl.
*G06F 16/2453* (2019.01)
*G06F 16/22* (2019.01)
*G06N 20/00* (2019.01)

(52) U.S. Cl.
CPC .... *G06F 16/24542* (2019.01); *G06F 16/2228* (2019.01); *G06F 16/24537* (2019.01); *G06F 16/24549* (2019.01); *G06N 20/00* (2019.01)

(58) Field of Classification Search
CPC .......... G06F 16/24542; G06F 16/2453; G06F 16/24549; G06F 16/2455; G06F 16/90335; G06F 16/2228
USPC ........................................................ 707/714
See application file for complete search history.

(56) References Cited

U.S. PATENT DOCUMENTS

| | | | |
|---|---|---|---|
| 6,934,699 B1 * | 8/2005 | Haas | G06F 16/24539 |
| 10,769,148 B1 * | 9/2020 | Binkert | G06F 16/24542 |
| 2005/0097072 A1 * | 5/2005 | Brown | G06F 16/2465 |
| 2010/0063948 A1 * | 3/2010 | Virkar | G06N 3/02 706/12 |
| 2011/0029508 A1 * | 2/2011 | Al-Omari | G06F 16/24542 707/718 |
| 2017/0147644 A1 * | 5/2017 | Lee | G06F 16/00 |
| 2018/0025093 A1 * | 1/2018 | Xia | G06F 16/90335 707/602 |
| 2018/0314744 A1 * | 11/2018 | Mathew | G06F 9/50 |
| 2019/0171773 A1 * | 6/2019 | Wang | G06F 16/23 |

* cited by examiner

*Primary Examiner* — Hung T Vy
(74) *Attorney, Agent, or Firm* — Perkins Coie LLP; Alberto Araiza

(57) ABSTRACT

The disclosed embodiments include a method performed by a data system. The method includes automatically learning relationship(s) among datasets based on one or more of a user query or an observation of a data flow through the data system. The method further includes generating an optimized data structure based on the learned relationships among the datasets. The data system then modifies a query plan to obtain query results that satisfy a query by reading the optimized data structure in lieu of reading the datasets.

26 Claims, 14 Drawing Sheets

PRUNED-RECORD PRESERVING JOIN

| REVIEWS | | | | USERS | | BUSINESSES | | | STATES | |
|---|---|---|---|---|---|---|---|---|---|---|
| REVIEW_ID | REVIEW_TEXT | BUSINESS_ID | USER_ID | USER_ID | USER_NAME | BUSINESS_ID | BUSINESS_NAME | STATE_ID | STATE_ID | STATE_NAME |
| 1 | AAA | 1 | 3 | 3 | HILL | 1 | XXX | CA | CA | CALIFORNIA |
| 2 | BBB | 1 | 2 | 2 | JILL | 1 | XXX | CA | CA | CALIFORNIA |
| 3 | CCC | 2 | 1 | 1 | JACK | 2 | YYY | CA | CA | CALIFORNIA |
| 4 | DDD | 3 | 2 | 2 | JILL | 3 | ZZZ | NV | NV | NEVADA |

*FIG. 11*

RECORD-PRESERVING JOIN

| REVIEWS | | | | USERS | | BUSINESSES | | | STATES | |
|---|---|---|---|---|---|---|---|---|---|---|
| REVIEW_ID | REVIEW_TEXT | BUSINESS_ID | USER_ID | USER_ID | USER_NAME | BUSINESS_ID | BUSINESS_NAME | STATE_ID | STATE_ID | STATE_NAME |
| 1 | AAA | 1 | 3 | 3 | HILL | 1 | XXX | CA | CA | CALIFORNIA |
| 2 | BBB | 1 | 2 | 2 | JILL | 1 | XXX | CA | CA | CALIFORNIA |
| 3 | CCC | 2 | 1 | 1 | JACK | 2 | YYY | CA | CA | CALIFORNIA |
| 4 | DDD | 3 | 2 | 2 | JILL | 3 | ZZZ | NV | | |

*FIG. 12*

OPTIMIZED DATA STRUCTURES OF A RELATIONAL CACHE WITH A LEARNING CAPABILITY FOR ACCELERATING QUERY EXECUTION BY A DATA SYSTEM

CROSS-REFERENCE TO RELATED APPLICATION

This application claims priority to U.S. provisional patent application Ser. No. 62/662,015 filed Apr. 24, 2018 and titled "Learning Relational Cache for Self-Service Data System," which is incorporated herein in its entirety by this reference thereto.

TECHNICAL FIELD

The disclosed teachings generally relate to techniques of a data system to accelerate query executions. The disclosed teachings more particularly relate to a relational cache that has learning capabilities to automatically generate optimized data structures that are adaptable to accelerate query executions by a data system.

BACKGROUND

Conventional data systems can collect, analyze, and act on data stored at data sources. The data sources may be computing devices that are internal, external, local, or remote relative to a data system. For example, an external data source can be a server connected over a computer network to the data system. In addition, existing data systems are not designed for end-users and are burdened by using extract, transform, and load (ETL) pipelines to pull data from the data sources and store the pulled data at a centralized data warehouse or data lake. A "data lake" may refer to a method of storing data within a system or repository, in its natural format, that facilitates the co-location of data in various schema and structural forms, usually object blobs or files.

Existing data systems offer partial and stale data for querying and analysis. As such, analysts typically spend significant amounts of time collecting and preparing data from data sources rather than analyzing the data with business intelligence (BI) tools that have analytics or visualization capabilities. In addition, data is often distributed across disparate data sources such that a user cannot readily connect a BI tool to a combination of data sources. A connection mechanism is often too slow, queries often fail, volumes of raw data are too large or complex, and data are often of mixed types.

Accordingly, users seek capabilities to access, explore, and analyze volumes of mixed data from distributed data sources without being burdened by rigid processes of existing data systems.

SUMMARY

The disclosed embodiments include a method performed by a data system. The method includes automatically learning relationship(s) among datasets based on one or more of a user query or an observation of a data flow through the data system. The method further includes generating an optimized data structure based on the learned relationships among the datasets. The data system can then modify a query plan to obtain query results that satisfy a query by reading the optimized data structure in lieu of reading the datasets. For example, the optimized data structure may reflect a user query pattern, a runtime statistic, a workload distribution, or a measure of cardinality, and the optimized data structure may include a join of the datasets or another operator in addition to the join.

Other aspects of the technique will be apparent from the accompanying Figures and Detailed Description.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 11 illustrates a four-way record-preserving join of FIG. 8 subject to the pruning algorithm illustrated in FIG. 10 according to some embodiments of the present disclosure;

FIG. 12 illustrates the four-way record-preserving join of FIG. 8 with a record shaded according to some embodiments of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

The disclosed embodiments include a relational cache with learning capabilities to automatically generate optimized data structures that are adaptable to accelerate query executions by a data system. In general, a data system is used for reporting and data exploration and analysis and is considered a core component of business intelligence (BI). A data system couples data sources and analysis/visualization tools typically accessible by users. The data system has analytics capabilities that enable entities (e.g., organizations, users, analysts, data scientists) to discover, curate, explore, and analyze diverse data from diverse data sources at any time.

The architecture of a data system can vary from IT-centric data systems to self-service data systems. An IT-centric architecture includes an extract, transform, and load (ETL) tool operable to pull data from disparate data sources and store the pulled data in a data warehouse or data lake. A BI tool can be used to query the data warehouse. An intermediate architecture may include an alternative storage such as HADOOP or cloud storage. The intermediate architecture includes data movement but offers a self-service BI tool for end-users. In contrast, a full self-service architecture replaces the ETL tool and data warehouse or alternative storage of the IT-centric architecture with a data system.

Figure 1A:
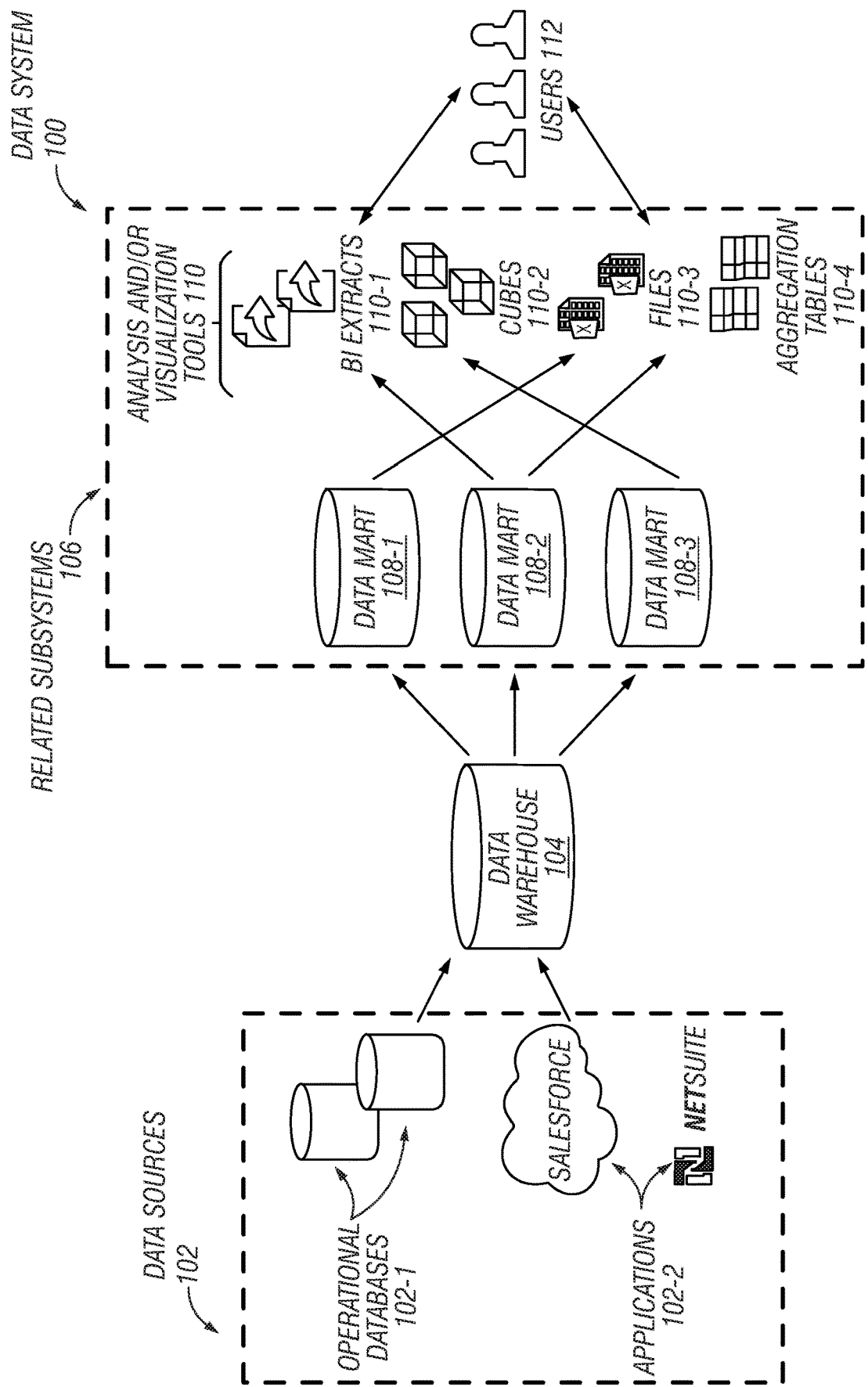
FIG. 1A is a block diagram that illustrates a data system according to some embodiments of the present disclosure.

FIG. 1A is a block diagram that illustrates components and dataflows of a data system. The data system 100 includes one or more data sources 102, a data warehouse 104, and related subsystems 106 such as, for example, one or more data marts 108, and one or more analysis and/or visualization tools 110 for use by a variety of users 112. Examples of the data sources 102 include operational databases 102-1 and applications 102-2 (e.g., SALESFORCE, NETSUITE), as well as other file systems, data lakes, data warehouses, etc.

In some embodiments, the data system 100 can connect to a combination of data sources 102 including non-relational and/or relational databases, data warehouses, and spreadsheets to gather data in response to a query. The data system 100 can simultaneously or asynchronously query data from the data sources 102. Other examples of data sources include NOSQL sources (e.g., MONGODB, HBASE, CASSANDRA), search sources (e.g., ELASTICSEARCH, SOLR), file storage sources (e.g., HDFS, NAS, LINUX CLUSTER, EXCEL/CSV), cloud computing (e.g., IaaS, PaaS, SaaS) sources (e.g., AMAZON S3), relational sources (e.g., MySQL, SQL server), and SaaS sources (e.g., SALESFORCE, MARKETO, GOOGLE SHEETS, and GITHUB). Examples of analysis or visualization tools include an analyst center (e.g., self-service portal), BI tools (e.g., QLIK SENSE, TABLEAU, POWER BI) via ODBC/JDBC, data science tools (e.g., R, PYTHON) and custom applications via REST.

The data warehouse 104 is a central repository of integrated data from the data sources 102. The data warehouse 104 can store current and historical data and use that data to create analytical reports for an organization. In some instances, an ETL-based data system can use staging, data integration, and access layers to house key functions. The staging layer or staging database (not shown) stores raw data extracted from each of the data sources 102. The integration layer integrates disparate data sets by transforming the data from the staging layer often storing this transformed data in an operational data store (ODS) database. The integrated data are then moved to another database (e.g., data warehouse 104), where the data is arranged into hierarchical groups, often called dimensions (e.g., dimension tables), and into facts and aggregate facts (e.g., fact tables). The combination of facts and dimensions is sometimes called a star schema. A "schema," as used herein, may refer to a structure that represents a logical view of an entire data store. It defines the organization of data and relationships among the data.

In some instances, the data obtained from data sources can be cleansed, transformed, catalogued, and made available to administrators or analysts for data mining, online analytical processing, research, and decision support. The broader means for retrieving, analyzing, and managing data could also be considered components of a data system. Thus, an expanded definition for a data system could include BI tools, tools to ETL data into a repository, and tools to manage and retrieve data.

The data marts 108 are each structure or access pattern specific to data warehouse environments and are used to retrieve client-facing data. In some instances, each of the data marts 108 is a subset of the data warehouse 104 and is usually oriented to a specific business unit (e.g., purchasing, sales, inventory functional areas). Hence, compared to an organization-wide data warehouse (e.g., data warehouse 104), the information in the data marts 108 pertains to a single business unit. In some deployments, each business unit is considered the owner of a specific data mart including all hardware, software, and data. This allows each business unit to isolate use, manipulation, and development of its data.

The analysis and/or visualization tools 110 may be utilized by users via BI software, which is a type of application software designed to retrieve, analyze, transform and report data for BI. The analysis and/or visualization tools generally read data that has been previously stored in, for example, the data warehouse 104 or the data marts 108. Examples of analyzation or visualization tools include spreadsheets, reporting and querying software (e.g., applications that extract, sort, summarize, and present selected data), online analytical processing (OLAP), digital dashboards, data mining, business activity monitoring, data warehouse, local information systems, data cleansing, or the like. Except for spreadsheets, the tools are typically standalone applications, suites of applications, components of enterprise resource planning systems, application programming interfaces, or components of software targeted to a specific industry. The tools are sometimes packaged into data warehouse appliances. The illustrated example includes BI extracts 110-1, cubes 110-2, files 110-3, and aggregation tables 110-4 that are available to the users 112 via BI software to perform analytics based on the data contained in the data warehouse 104 or data marts 108. For example, users can connect to and utilize the cubes 110-2, the files 110-3, and the aggregation tables 110-4 via BI tools to perform analytics based on the data contained in the data warehouse 104 or data marts 108. The BI tools can additionally visualize the BI extracts 110-1.

Figure 1B:
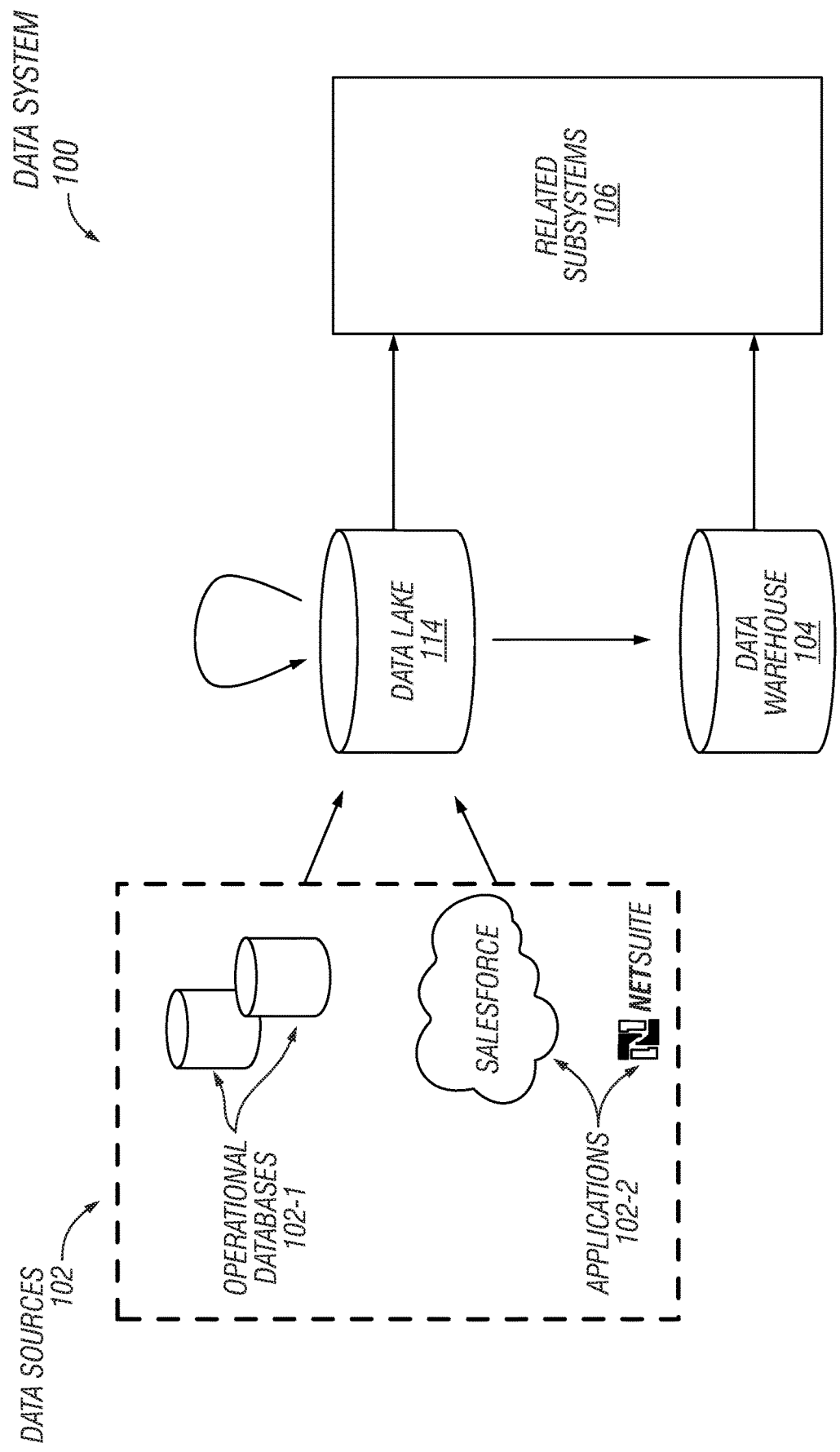
FIG. 1B is a block diagram that illustrates a data system including a data lake according to some embodiments of the present disclosure.

FIG. 1B is a block diagram that illustrates a representation of the data system 100 including a data lake. The data lake 114 (e.g., AMAZON S3, AZURE DATA LAKE STORE (ADLS), HADOOP FILE SYSTEM (HDFS)) is a system or repository of data stored in its natural format, usually object blobs or files. The data lake 114 is usually a single store of all enterprise data including raw copies of source system data and transformed data used for tasks such as reporting, visualization, analytics and machine learning. The data lake 114 can include structured data from relational databases (e.g., rows and columns), semi-structured data (e.g., CSV, logs, XML, JSON), unstructured data (e.g., emails, documents, PDFs) and binary data (e.g., images, audio, video).

The disclosed data system may include features that improve user experience as well as performance. Examples include data management and preparation, integration with diverse data sources, handling dynamic schemas, dataset namespace and path structures, exposing dataset information, data intelligence, user-defined data security, a relational cache memory for accelerating query executions, and a BI tool launcher. The data system may not require defining a schema, data model, or to ETL data to query a data source. A "data model," as used herein, may refer to fundamental entities to introduce abstraction in a database management system. Data models can define how data is interconnected, processed, and stored in a data system.

In some embodiments, the data system 100 supports a range of structured query language (SQL) commands. SQL is a domain-specific language often used to interact with a database management system. SQL commands can be used to specify the desired query. SQL commands may include joins, correlated sub-queries, and window functions. The data system may be aware of data sources and their native capabilities to employ native query processes.

The disclosed data system can accelerate a query execution process to rapidly obtain query results that satisfy a query. For example, the data system 100 can create optimized data structures (also referred to herein as "reflections") based on data obtained from the data sources to improve subsequent query executions. A user can use manage and explore processes to edit the reflections. The query results can undergo an analysis or visualization process in response to the query execution. For example, a BI tool can be used to visualize query results.

More specifically, a reflection refers to a materialization of data and the query plan defining that materialization. A query plan could be, for example, the equivalent of a SQL query "select customer, sum(amount) from purchases." When the data system receives a query from a user device, an optimizer engine ("optimizer") considers the query plans of the data reflections in a relational cache to determine whether it is possible to substitute part of the user's query plan with any reflections in order to reduce the query cost (e.g., reduce execution processing and/or time) while maintaining the same query results. This capability allows customers of a data system to experience performance improvements of many orders of magnitude on many workloads.

The disclosed embodiments may include different types of reflections. For example, a reflection anchored to a single dataset could be a raw reflection or an aggregation reflection. A raw reflection has all the records in a dataset but perhaps only some of its data columns, sorted, partitioned and distributed by specific columns. An aggregation reflection has aggregation (i.e., summarization) of a dataset similar to an OLAP cube with dimensions and measures. An aggregation reflection can be used to accelerate aggregation queries. Another type of optimized data structure is a sample reflection that has samples of data from a dataset. A sample reflection can be used by the data system to accelerate query processes by many orders of magnitude if a user allows for approximate query results (e.g., within 0.1% statistical error) based on sampled data.

The disclosed data system can determine whether to leverage reflections when defining or modifying a query plan based on a receive query. For example, the data system can compile a received SQL query from a client device to define a query plan. The query plan describes how the query will execute, including all operations needed in order to compute the query results. When the data system determines that any reflections can be used to accelerate a query, the data system may generate the query plan or modify a generated query plan to utilize the reflections rather than directly query data sources.

Relational Cache Memory

Given the diverse needs of different data consumers in an organization, adopting a single, standard representation of data in a data warehouse for the organization is nearly impossible. Even when a centralized data warehouse exists, there is a need for different representations of the stored data for different use cases and users. As a result, data is often extracted and copied from a data warehouse (e.g., data warehouse 104) into data marts (e.g., data marts 108) and/or in other representations of data (e.g., business BI servers 110-1, cubes 110-2, spreadsheet files 110-3, aggregation tables 110-4). The rise of data lake techniques (e.g., using the data lake 114) make it easier to load data into a centralized repository but has exacerbated the aforementioned challenges by relaxing data modeling requirements and facilitating even more data copies through technologies such as data preparation tools and frameworks such as SPARK and MAPREDUCE.

In some embodiments, the disclosed technology overcomes these drawbacks by introducing a logical data tier, which enables users to curate data by creating and sharing virtual datasets without incurring the computing costs and risks associated with physical datasets. As used herein, a "physical dataset" may refer to raw data contained in data sources connected to the data system. As used herein, a "virtual dataset" refers to a dataset derived from physical dataset(s) or other virtual dataset(s). The data system does not need to save the data/content of a virtual dataset. Instead, the data system only needs to save the definition of a virtual dataset (e.g., a "SELECT" statement in SQL analogous to a database view). The virtual datasets are derivable from physical datasets or other virtual datasets, which can be defined via an SQL SELECT statement. By expanding all the virtual datasets recursively, any virtual dataset can be represented internally as a query plan (e.g., using relational algebra) on one or more physical datasets (e.g., PARQUET files, ORACLE tables, directories of CSV files on AMAZON S3, ELASTICSEARCH indices/types, MONGODB collections).

The disclosed data system can utilize reflections to accelerate a query execution compared to directly querying datasets contained in one or disparate data sources. For example, the disclosed data system can create reflections based on physical or virtual datasets. The reflections can reside in memory or on persistent storage. These reflections are referred to as a "relational cache" (also referred to herein as an "autonomous memory" or "reflections data store"). In some embodiments, a reflection can be created autonomously by the relational cache and/or manually by a user of the data system. That is, users can manually designate any combination of datasets to accelerate and/or the system may decide which reflections to create autonomously based on, for example, past queries and workloads for processing queries. In some embodiments, a reflection is anchored to at least one physical or virtual dataset. At query time, using a reflection can accelerate querying meant for any underlying source datasets.

The relational cache memory that stores the reflections is sometimes referred to as "autonomous" because the data system can autonomously decide to generate reflections that are stored in the autonomous memory for use to accelerate queries. When seeking to query a data source, the end-user does not need to consider any reflections or know of their existence. Rather, the use of reflections by the data system to accelerate a query is transparent to users. For example, when a query is received via a BI tool, an optimizer of the data system determines an optimal query execution plan ("query plan"), which may include pushing sub-queries down to data sources and/or utilizing reflections.

A reflection may contain data of any type or size. The data system knows the definition (i.e., logical plan) of the reflection, which allows the data system to refresh the data of the reflection and to determine, at query time, whether that reflection can accelerate the computation of the query results. The optimizer of the data system can identify an opportunity to leverage a reflection when there is a way to compute the query results from the reflection. In some embodiments, the optimizer may return an approximate query result within some user allowable tolerance when reflections are available for such approximation rather than obtaining exact results.

The data system may decide whether to create reflections autonomously, based on user input, or combinations thereof. For example, to facilitate management, the data system can have each reflection anchored to a specific dataset (physical or virtual). This facilitates the ability of an administrator to understand what a reflection contains and facilitates identifying queries on a dataset that are executing too slow such that a user can request creation of a reflection anchored to that highly queried dataset.

Figure 2:
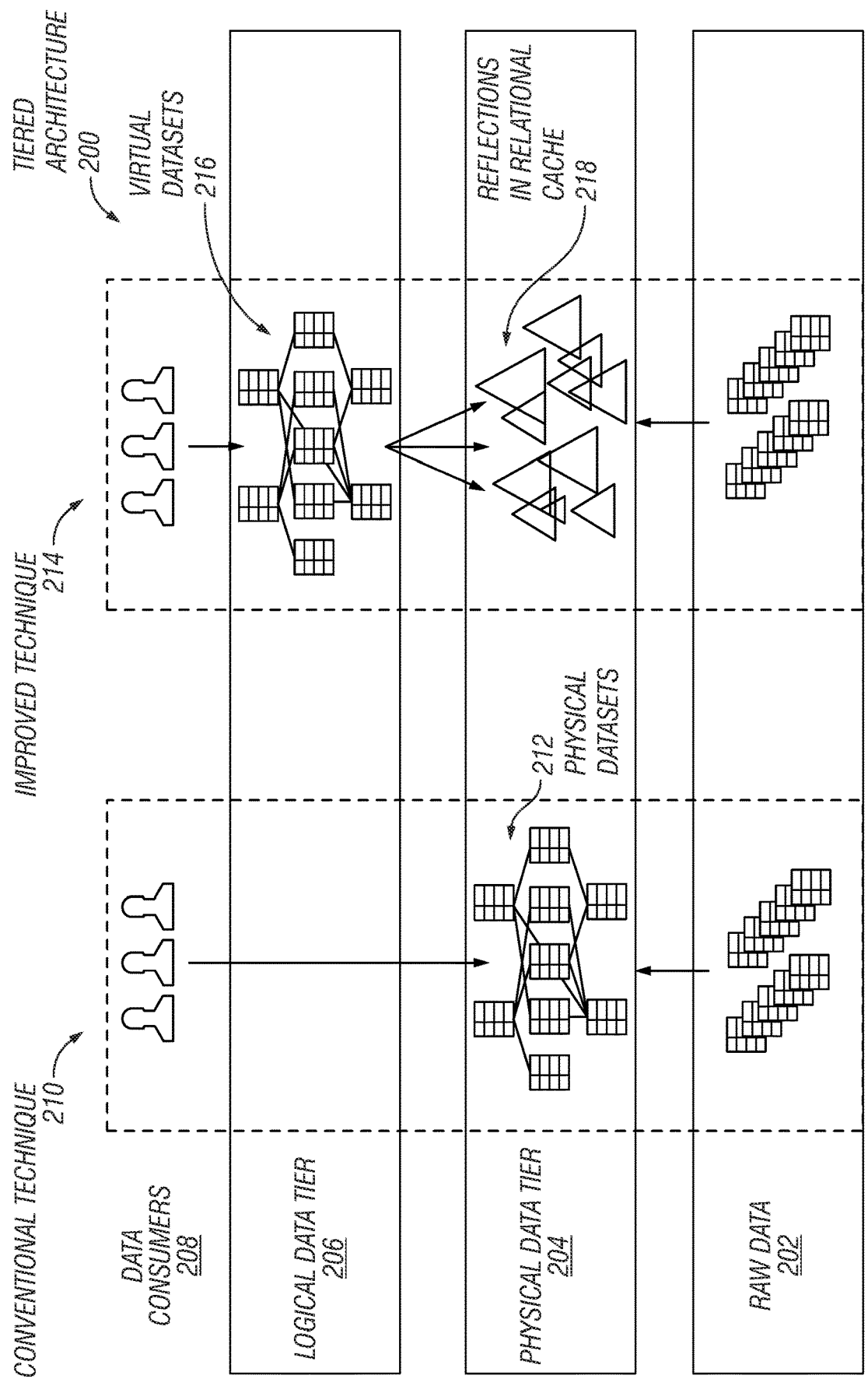
FIG. 2 is a block diagram that illustrates tiered processing by a data system to accelerate query executions according to some embodiments of the present disclosure.

FIG. 2 is a block diagram that illustrates tiered processing by a data system to accelerate query executions. As shown, a tiered architecture separates a logical data tier from a physical data tier to improve query execution processing. From the bottom up on FIG. 2, the tiered architecture 200 has raw data 202, physical data tier 204, logical data tier 206, and data consumers 208. In the conventional technique 210, the data consumers 208 can access physical datasets 212 directly from a physical data tier 204. The physical datasets 212 may be derived from raw data 202.

In the improved technique 214, the data consumers 208 can access and query virtual datasets 216 from the logical data tier 206. As illustrated, the triangles of the relational cache 218 represent reflections. Hence, queries from the data consumers 208 may reference the virtual datasets 216 (represented by the tables in the logical data tier 206). A data system optimizer is responsible for rewriting the query plans, when possible, to leverage the data reflections, and to reduce the overall cost of executing the query.

The relational cache 218 is configured to create reflections based on data from data sources. The relational cache 218 contains the reflections that are used at query time rather than relying solely on querying data in the data sources. The relational cache 218 may include a combination or cluster of in-memory storage, on-disk storage, a distributed file system (e.g., HDFS), a blob or object store (e.g., AMAZON S3), or a database. The relational cache 218 is communicatively coupled to data sources and the data system (not shown in FIG. 2). The relational cache 218 can accelerate a query execution process upon receiving a query for data contained in data sources. Specifically, the relational cache 218 can be queried in lieu of querying data sources or in addition to querying the data sources. Hence, the process for obtaining query results is accelerated because the data system can avoid querying remote and/or disparate data sources.

The operations of the relational cache 218 are transparent to the data consumers 208. In some embodiments, a user of a device coupled to the data system can view or modify reflections by using the controls via a display, in which case the data system creates and stores the changed reflections in the relational cache for subsequent use during query time. The reflections contained therein enable a data system to accelerate queries from data consumers and tools. In some embodiments, the data system optimizer can "push down" queries to the underlying data sources; however, the data reflections provide optimized data structures that are more efficient for analytical queries.

Figure 3:
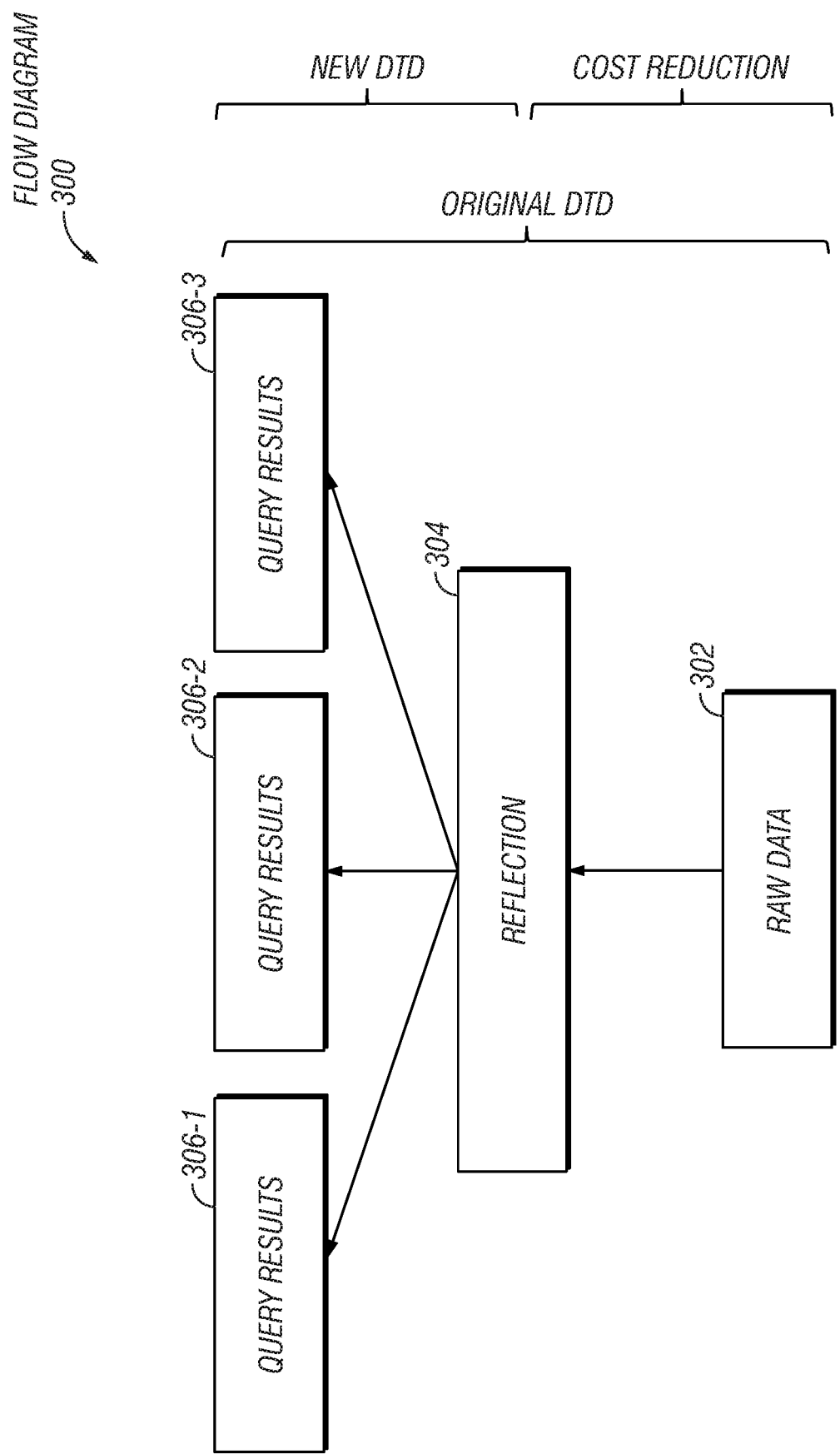
FIG. 3 is a flow diagram that illustrates a process for accelerating a query execution with an optimized data structure according to some embodiments of the present disclosure.

FIG. 3 is a flow diagram that illustrates a process for accelerating a query execution with a reflection stored in a relational cache. In the flow diagram 300, a reflection 304 is formulated based on raw data 302 via, for example, an arbitrary operator direct acyclic graph (DAG). The relational cache prioritizes the reflection 304 over the raw data 302 to efficiently and rapidly obtain query results 306 sought by the user. As shown, the different query results 306-1, 306-2, and 306-3 could be obtained from the same reflection 304 in response to one or more queries. As shown, the original distance-to-data (DTD) spans from the raw data 302 to the query results 306. Introducing the reflection 304 reduces costs and latency and shortens the DTD.

Figure 4:
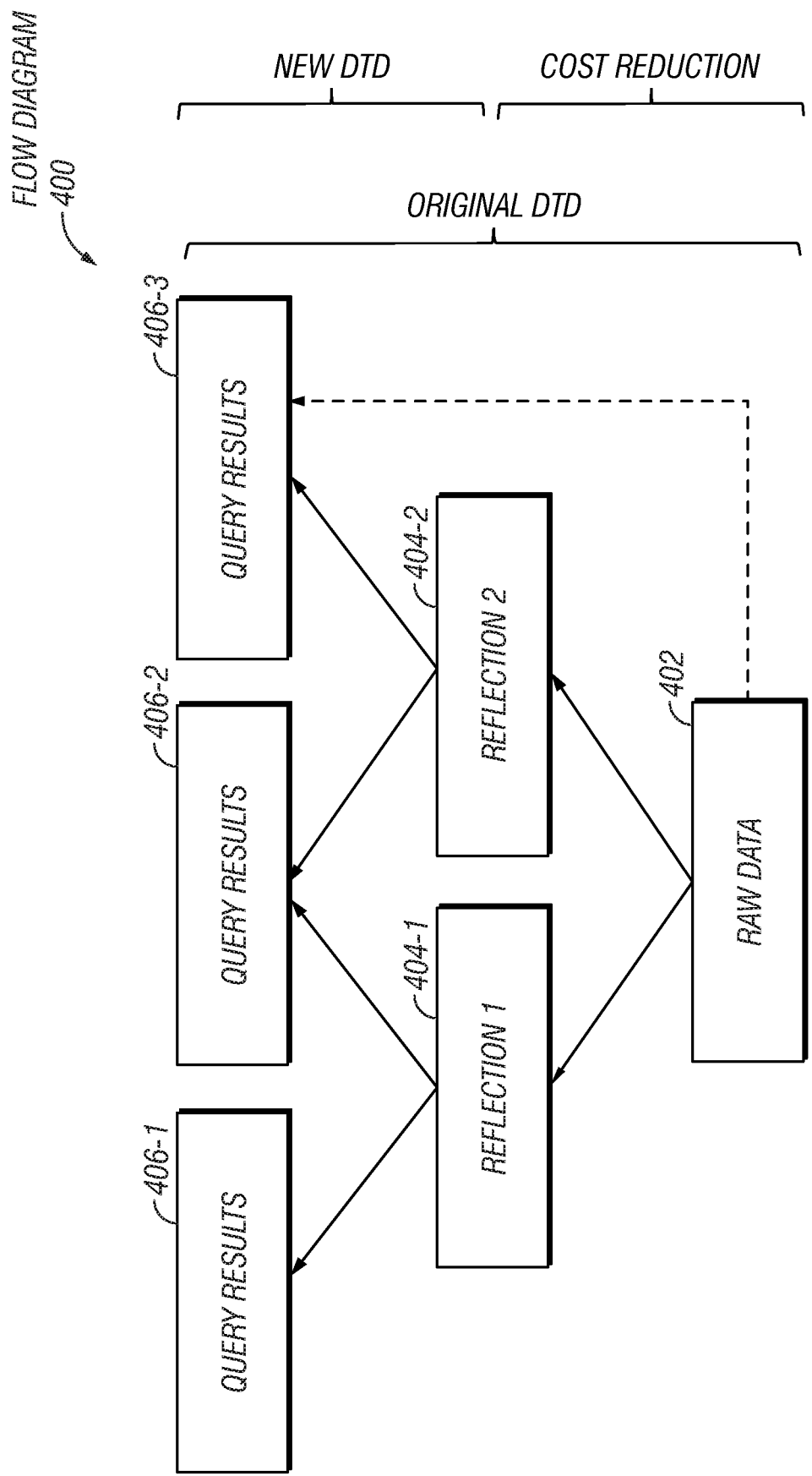
FIG. 4 is a flow diagram that illustrates a process for accelerating a query execution with a complex interconnection of optimized data structures according to some embodiments of the present disclosure.

FIG. 4 is a flow diagram that illustrates a process for accelerating a query execution with a complex interconnection of reflections. In the flow diagram 400, two reflections 404-1 and 404-2 are formulated based on raw data 402 via, for example, an arbitrary operator DAG. The relational cache prioritizes the reflections 404 over the raw data 402 to efficiently and rapidly obtain the query results 406. The query result 406-1 is obtained from only the reflection 404-1, and the query result 406-3 is obtained from only the reflection 404-2. In contrast, the query result 406 is obtained from a combination of both the reflections 404-1 and 404-2. As shown, the original DTD spans from the raw data 402 to the query results 406 and introducing the reflection 304 shortens the DTD because of cost reductions.

Figure 5:
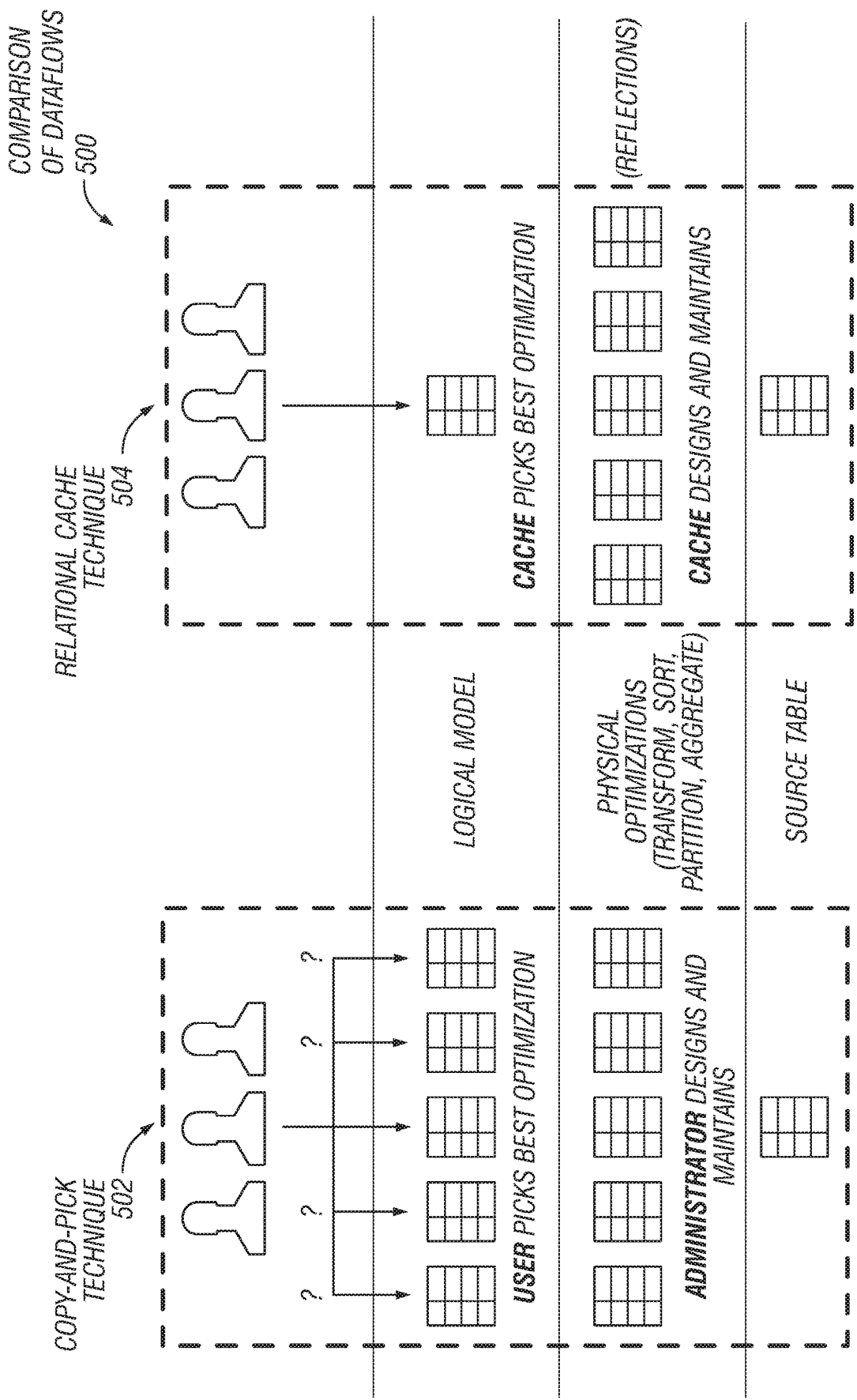
FIG. 5 is a block diagram that illustrates comparing an existing technique for processing a query and using a relational cache to accelerate query execution according to some embodiments of the present disclosure.

FIG. 5 is a block diagram that illustrates comparing an existing technique for processing a query and using a relational cache to accelerate query execution. More specifically, FIG. 5 shows some benefits of a relational cache by comparing a copy-and-pick technique 502 and a relational cache technique 504. In the copy-and-pick technique 502, a user picks a suitable optimization of data. An administrator designs and maintains these physical optimizations, which are obtained from one or more source tables. In contrast, in the relational cache technique 504, the best physical optimization of a logical model is picked by the relational cache. The physical optimizations are designed and maintained by the relational cache technique 504 and obtained from one or more source tables.

Figure 6:
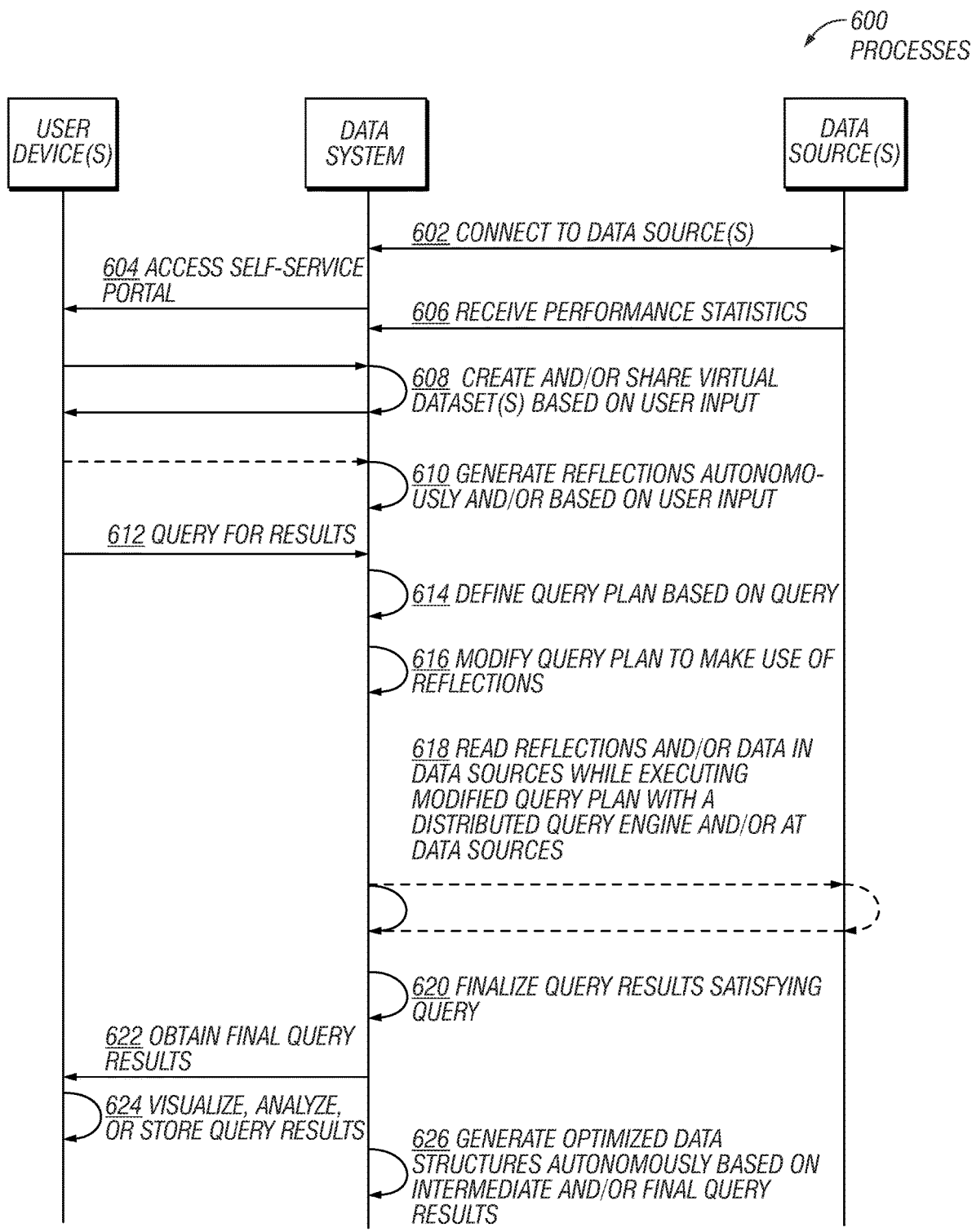
FIG. 6 is a flowchart that illustrates a process for accelerating a query execution by a data system according to some embodiments of the present disclosure.

FIG. 6 is a flowchart that illustrates a process for accelerating a query execution by a data system. In step 602, the data system connects to one or more data sources. In step 604, a user device displays an interface of the data system on a display of the user device. For example, the user may open a web portal administered by the data system that enables the user to query data sources connected to the data system.

In step 606, the data system may determine or receive statistics or capabilities information of the data sources. The statistics or capabilities can be used to formulate an optimal query plan for executing a query at any time. Although shown as occurring after step 604, the statistics or capabilities information can be obtained at any time. For example, the statistics or capabilities information can be obtained after receiving the query and then stored in a local memory. The data system can retrieve the statistics and capabilities information from the local memory when needed to improve a query plan.

In step 608, a user may use a visual dataset editor of the interface or a SQL statement to create a virtual dataset and/or share the virtual dataset with other users. The process for creating and sharing virtual datasets is optional.

In step 610, the data system generates one or more optimized data structures (i.e., reflections). The decision to generate reflections may be autonomous and the process for generating the optimized data structure may be automatic. In some embodiments, the decision to generate reflections may be based on user input. In some embodiments, the decision and/or process for generating a reflection can be based on a combination of autonomous, manual, or automatic steps.

In step 612, the data system receives a query from a user device, which may be the same or different from the user device of steps 604 or 608. The query may refer to physical datasets and/or virtual datasets. The query may be received from the user device over a network coupled to a coordinator of the data system.

In step 614, the data system executes a process to define a query plan based on the received query. For example, the query plan can define the operators that constitute the computation for the query. The data system may define the query plan based on a relational model and other considerations. For example, the query plan may be defined based on the collected information including the functional abilities of the data sources and other parameters. For example, a query plan may employ execution capabilities of a data source at a query planning phase, optimization phase, or query execution phase.

In step 616, the query plan is modified to utilize reflections in lieu of only querying the data sources directly for query results. In some embodiments, the original process for defining the query plan may consider any available reflections including their ordering, partitioning, and distribution. In other embodiments, the defined query plan is re-defined if reflections that could accelerate query executions are identified. In some embodiments, the query plan may be broadened, modified to use reflections, and/or modified to use the performance statistics obtained in step 606.

The data system can determine whether the modified query plan only needs to read the selected reflections to obtain query results or needs to read the data contained in the data sources as well. Therefore, the query execution is accelerated by reading the selected reflections in lieu of reading at least some data from the data sources. On the other hand, if the query execution cannot be accelerated, the query plan is defined to read data from the data sources to compute the query results.

In some embodiments, an optimizer can optimize the query plan defining the execution of a query. The optimizer can explore opportunities to utilize reflections contained in the relational cache rather than processing raw data in the data sources at query time. In some embodiments, the query results satisfying a query can be obtained more rapidly from the relational cache rather than directly from the data source. Further, the computational cost is reduced by utilizing the relational cache in lieu of data sources. As such, the optimizer may consider all the optimized data structures in the relational cache when a new query is received and automatically define a query plan to utilize optimized data structures when possible.

In step 618, execution of the modified query plan begins with one or more executors obtaining data into buffers from data sources. The executors can read physical datasets contained in remote data sources and/or reflections contained in the relational cache. The data is read while executing the modified query plan with a distributed or non-distributed query engine of the data system and/or the data sources.

In step 620, the data system obtains query results that satisfy the received query. In some embodiments, intermediate query results obtained from data sources and/or the relational cache are combined to produce final query results that satisfy the query. For example, an executor can merge data from other executors to produce the final query results. The merged data can be streamed as final query results to a coordinator of the data system.

In step 622, the client device receives the final query results from the data system. The user can operate the portal connected to the data system to view, manipulate, and analyze the final query results. In step 624, the final query results may be rendered as text or a visualization, persisted, or a calculation may be performed on the final query results to obtain further results.

In step 626, the data system can generate reflections based on the final query results rather than from the datasets of the data sources. The decision to generate reflections may be autonomous or based on user input. Further, the process for generating reflections may be automatic. The newly created reflections can be used to accelerate subsequent query executions based on subsequent received queries.

The data system can intelligently decide when to generate reflections and what data of the data sources to materialize in the relational cache. For example, the data system can make the determination based on user input and/or an algorithm that considers various factors or constraints. The data system can determine what data and queries are more common than others. The data system can materialize frequently queried data or data related to the frequently queried data to improve query capabilities with rapid access compared to accessing the data sources directly. The data system may materialize data based on relationships between datasets. The data system may materialize a difference between the two datasets (i.e., the delta). The data system can also generate alternative materializations to provide optimal query completion performance.

The data system can use machine learning (ML) and artificial intelligence (AI) to identify query patterns. The ML/AI allows the data system to present users with better choices, identify both ideal patterns and patterns to be avoided. Examples include join recommendations, common multistep preparation and transformation patterns, common value filtering, aggregation patterns, frequent calculated fields, preexisting datasets that might include what is desired (i.e., "similar datasets").

FIG. 6 illustrates an example of a specific series of steps that could be reordered in other examples. In some embodiments, one or more of the steps in FIG. 6 can be omitted without departing from the spirit of the disclosure. For example, the user device need not visualize query results as shown in step 626 and the data system need not generate any reflections based on query results. Further, the data system may receive the performance statistics of step 606 at any time or never obtain these statistics at all.

Learning Engine

The disclosed data system includes a learning engine that enables the data system to learn and adapt as it sees user queries and observes data flowing through the data system. For example, rather than expecting an administrator to provide details about relationships between datasets (e.g., fact-dimension relationships), the learning engine can automatically learn relationships and leverage them for broader reflection matching or enhanced transformation recommendations. For example, the data system can create a reflection that can be pruned to match a variety of queries such that each query execution is accelerated by using a variation of the same reflection. For example, the optimizer can consider the reflections in the relational cache and decide whether one or multiple can be utilized to accelerate the execution of the query plan. The optimizer is looking for a "match" for this query. Therefore, the disclosed data system can learn from data to improve reflection matching and reduce a quantity of reflections necessary to achieve a desired query performance that is improved by orders of magnitude.

Figure 7:
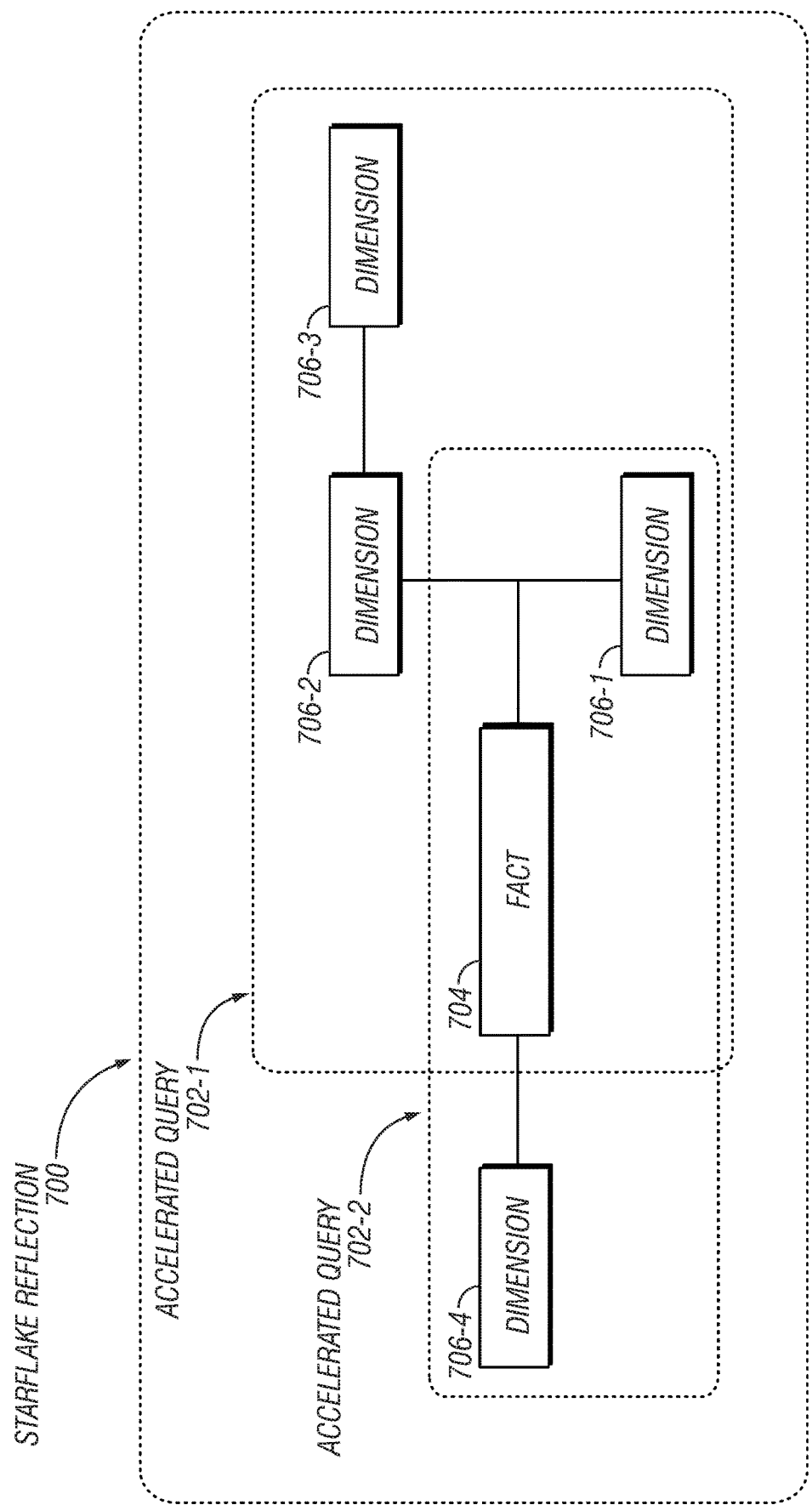
FIG. 7 is a block diagram that illustrates a reflection that joins multiple datasets according to some embodiments of the present disclosure.

FIG. 7 is a block diagram that illustrates a reflection that joins multiple physical datasets in which some or all of the joins are "record-preserving." This star/snowflake-type reflection ("starflake reflection 700") can include aggregate data and/or raw data. As shown, a learning engine automatically understood fact-dimension relationships between datasets to leverage the relationships for accelerated queries 702-1 and 702-2. The accelerated queries 702-1 and 702-2 share a common fact table 704 and related dimension table 706-1. The accelerated query 702-1 additionally has dimension tables 706-2 and 706-3 that are related to the fact table 704 but not included in the accelerated query 702-2. The accelerated query 702-2 additionally has dimension table 706-4 that relates to the fact table 704 but is not included in the accelerated query 702-1.

Record-Preserving Joins

Figure 8:
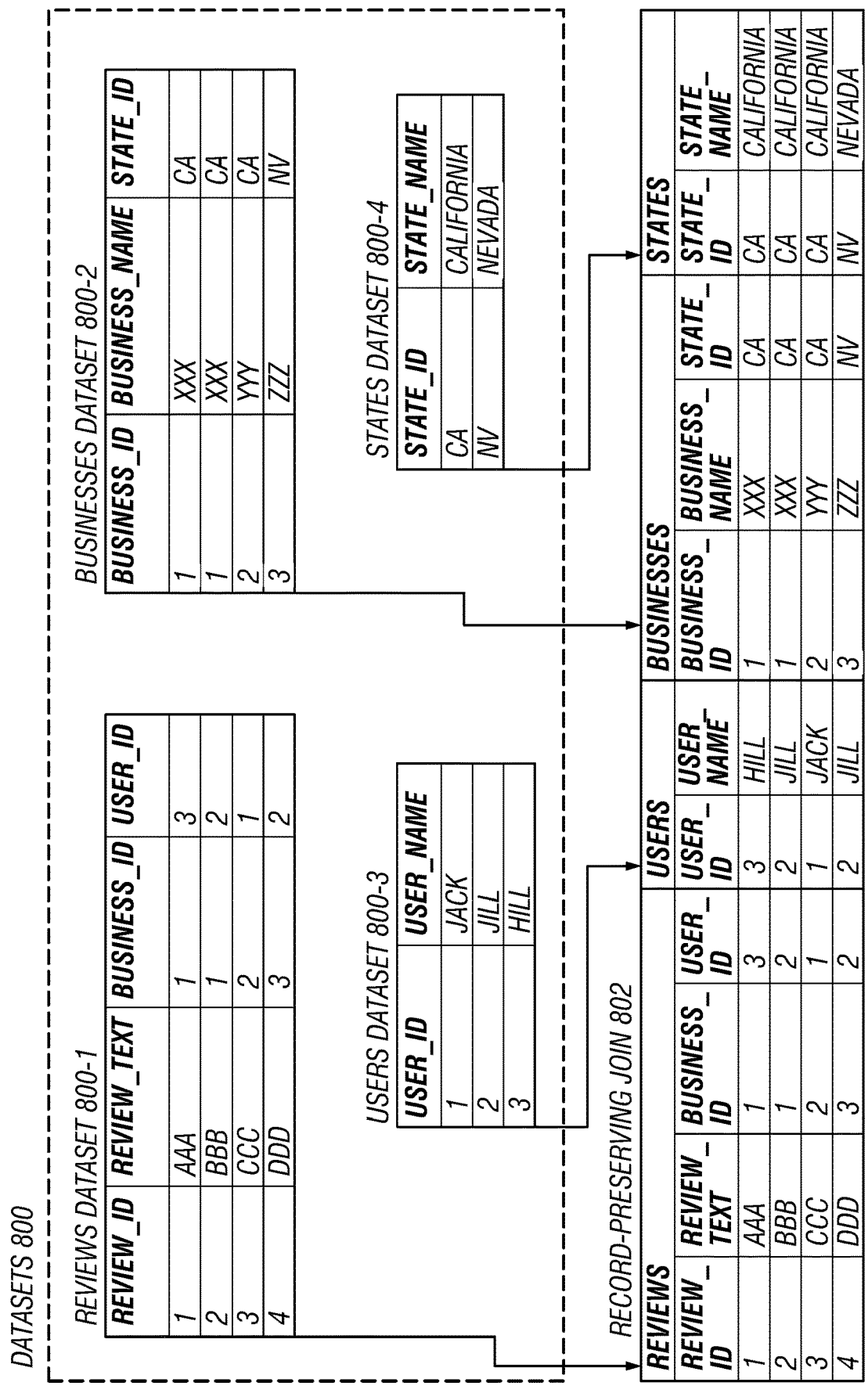
FIG. 8 illustrates an example of four datasets that are combined to form a four-way record-preserving join of a starflake reflection according to some embodiments of the present disclosure.

To understand record-preserving joins, FIG. 8 illustrates an example of four datasets that are combined to form a record-preserving join of a starflake reflection. In this example, the datasets 800 include a "reviews" dataset 800-1, "businesses" dataset 800-2, "users" dataset 800-3, and "states" dataset 800-4. Each dataset 800 includes at least one record (a row) that has at least one field (per column). For example, the reviews dataset 800-1 has four records and each record has four fields. Although this example only shows four datasets that have a certain number of records and fields, the disclosed embodiments encompass any number of datasets (with any number of records and fields) that can be combined in a record-preserving join.

In this example, the reviews dataset 800-1 contains business reviews, each linked to a user field in the users dataset 800-3 and a business field in the businesses dataset 800-2. The businesses dataset 800-2 lists businesses, each linked to the state field in the states dataset 800-4 in which the business resides. For each and every review, there is exactly one matching business and one matching user. In addition, for each and every business, there is exactly one matching state.

The resulting four-way join therefore contains exactly one record for each of the original records in the reviews dataset 800-1. Hence, the resulting four-way join is "record-preserving" because each of the original records of the reviews dataset 800-1 can be identified in the join. In other words, the join is effectively adding columns to the reviews dataset 800-1 from the businesses dataset 800-2, the users dataset 800-3, and the states dataset 800-4. The four-way record-preserving join 802 is an example of the basis for a starflake reflection.

In some embodiments, record-preserving joins may be common in data warehousing, where there is often a fact table and multiple dimension tables as depicted in FIG. 7. In the example of FIG. 8, the reviews dataset is a fact table, while the other datasets are respective dimension tables. If the dimension tables are de-normalized, the schema is referred to as a star schema. If the dimension tables are normalized, as in the example of FIG. 8, the schema is referred to herein as a snowflake schema. If some dimension tables are de-normalized and some are normalized, the schema is referred to as a starflake schema. Hence, the term "starflake" is broad because any reflection that contains at least one record-preserving join may be considered a starflake reflection.

Identifying Starflake Reflections

At any point in time when a data system executes a join, the data system can record whether that join is a record-preserving join. For example, assuming a join of columns with no duplicates, an inner join of A and B gives the result of A intersect B (e.g., the inner part of a Venn diagram intersection) and an outer join of A and B gives the results of A union B (e.g., the outer parts of the Venn diagram union). An outer join is a record-preserving join if the number of records in the resulting dataset is equal to the number of records in one of the original datasets. An inner join, on the other hand, is a record-preserving join if every record in one of the original datasets was matched in the join, and the number of records in the resulting dataset is equal to the number of records in that same original dataset. Hence, a join can be record-preserving in one direction, both, or not at all.

Thus, if a reflection creation job consists of one or more record-preserving joins, the data system considers the reflection as a starflake reflection. There is no need for a user to explicitly designate fact and dimension tables or indicate that a join is record-preserving. A starflake reflection may include various operators in addition to joins. For example, an "aggregation" reflection could be defined as:

SELECT user_id, user_name, state_name, COUNT(*)
FROM reviews, users, businesses, states
WHERE reviews.user_id=users.user_id AND
reviews.business_id=businesses.business_id AND
businesses.state_id=states.state_id
GROUP BY user_id, user_name, state_name Starflake reflections can be utilized by the data system optimizer to accelerate queries that include a dataset in the starflake reflection whose records were "preserved" by the joins (e.g., the fact table in a star, snowflake, or starflake schema). For example, the earlier example reflection could help accelerate the following query:

SELECT user_id, user_name, COUNT(*)
FROM reviews, users
WHERE reviews.user_id=users.user_id
GROUP BY user_id, user_name In this example, the query joins a subset of tables involved in the starflake reflection (e.g., users and reviews, rather than users, reviews, and businesses). The optimizer can determine that the starflake reflection can be substituted in the query plan and can use this reflection to accelerate the query. This is a unique and powerful capability as there are potentially very large numbers of variations of queries that can be accelerated from a single starflake reflection.

Starflake Reflection Matching

The disclosed technology can include one or more algorithms that can identify whether the data system can modify a query plan to utilize an existing starflake reflection stored in the relational cache. For example, a multi-phase algorithm can first determine whether to consider a starflake reflection, and then determine whether the starflake reflection offers an actual match to data referred to in a query.

Figure 9:
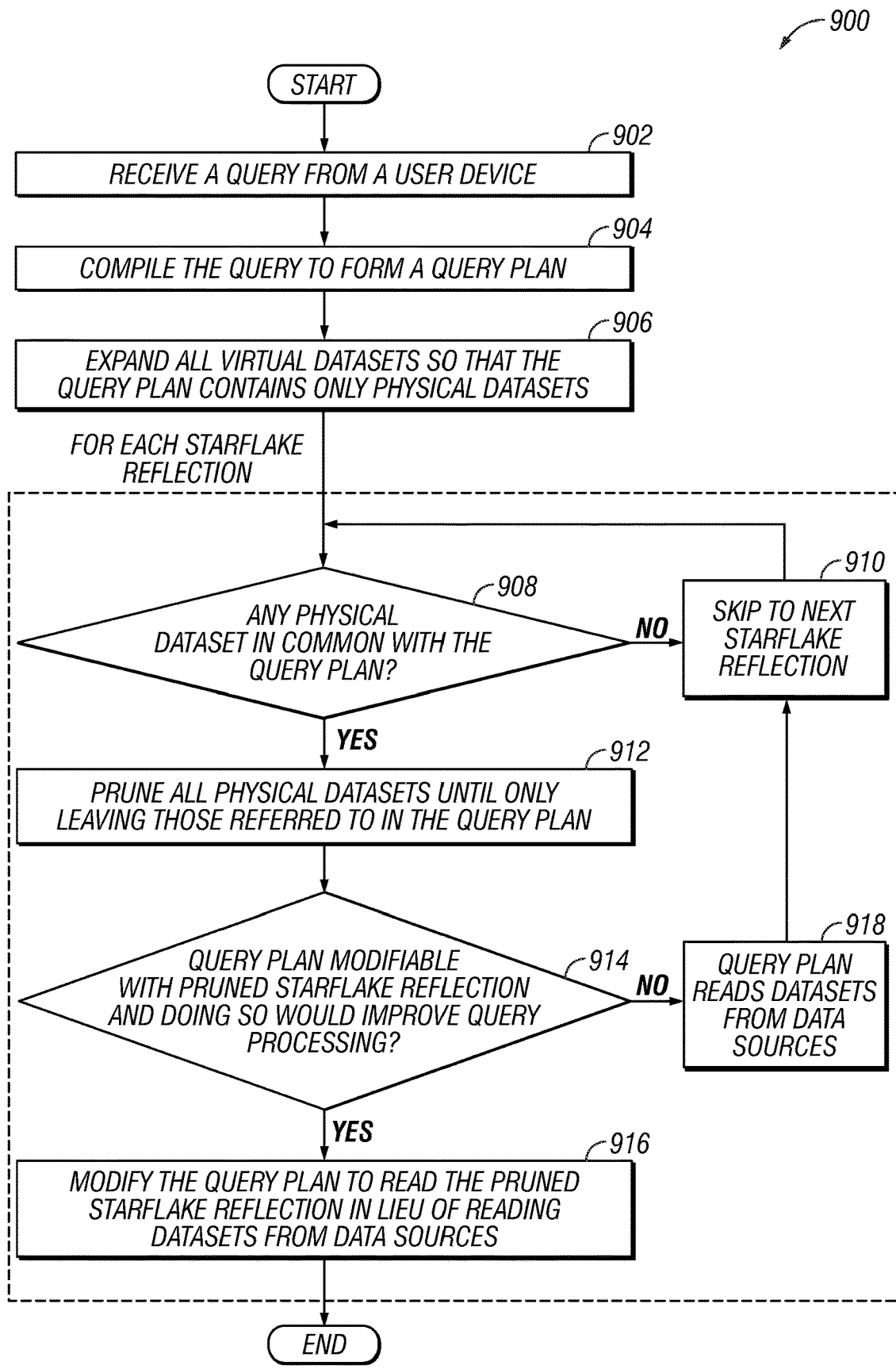
FIG. 9 is a flowchart that illustrates a multi-phase process performed by a data system to modify a query plan with one or more starflake reflection(s) according to some embodiments of the present disclosure.

FIG. 9 is a flowchart of a multi-phase process performed by a data system that modifies a query plan to utilize starflake reflections. The processing of a query plan to utilize starflake reflections and further accelerate query processing can be incorporated into the process described with respect to FIG. 6 (e.g., steps 614 and 616).

In step 902, the data system receives a query from the user device. For example, the query can be input by a user of a user device via a BI tool. The query may refer to physical datasets and/or virtual datasets. The query may be received by the data system from the user device over a network coupled to the data system.

In step 904, the data system compiles the query into a query plan. That is, the data system executes a process to define a query plan based on the received query. For example, the query plan can define operators that constitute the computation for the query. The data system may define the query plan based on a relational model and other considerations as described with respect to FIG. 6. In step 906, the data system expands all virtual datasets so that the user query plan contains only physical datasets.

For each starflake reflection stored in the relational cache, the data system can perform a series of steps to modify a query plan with one or more of the starflake reflections. In step 908, an optimizer of the data system determines whether a starflake reflection has at least one physical dataset in common with the query plan. If not, the optimizer skips to the next starflake reflection stored in the relational cache according to step 910. That is, the optimizer drops the starflake reflection from consideration and goes to the next starflake reflection.

On the other hand, in step 912, if the starflake reflection has a physical dataset in common with the query plan, the optimizer prunes any physical datasets that are connected through a record-preserving join from the starflake reflection until all the remaining physical datasets are among those referenced in the query plan. The pruning process of step 912 can repeatedly consider "leaf" datasets of a starflake reflection and remove any datasets that are not included in the query plan but are connected through a record-preserving join.

Figure 10:
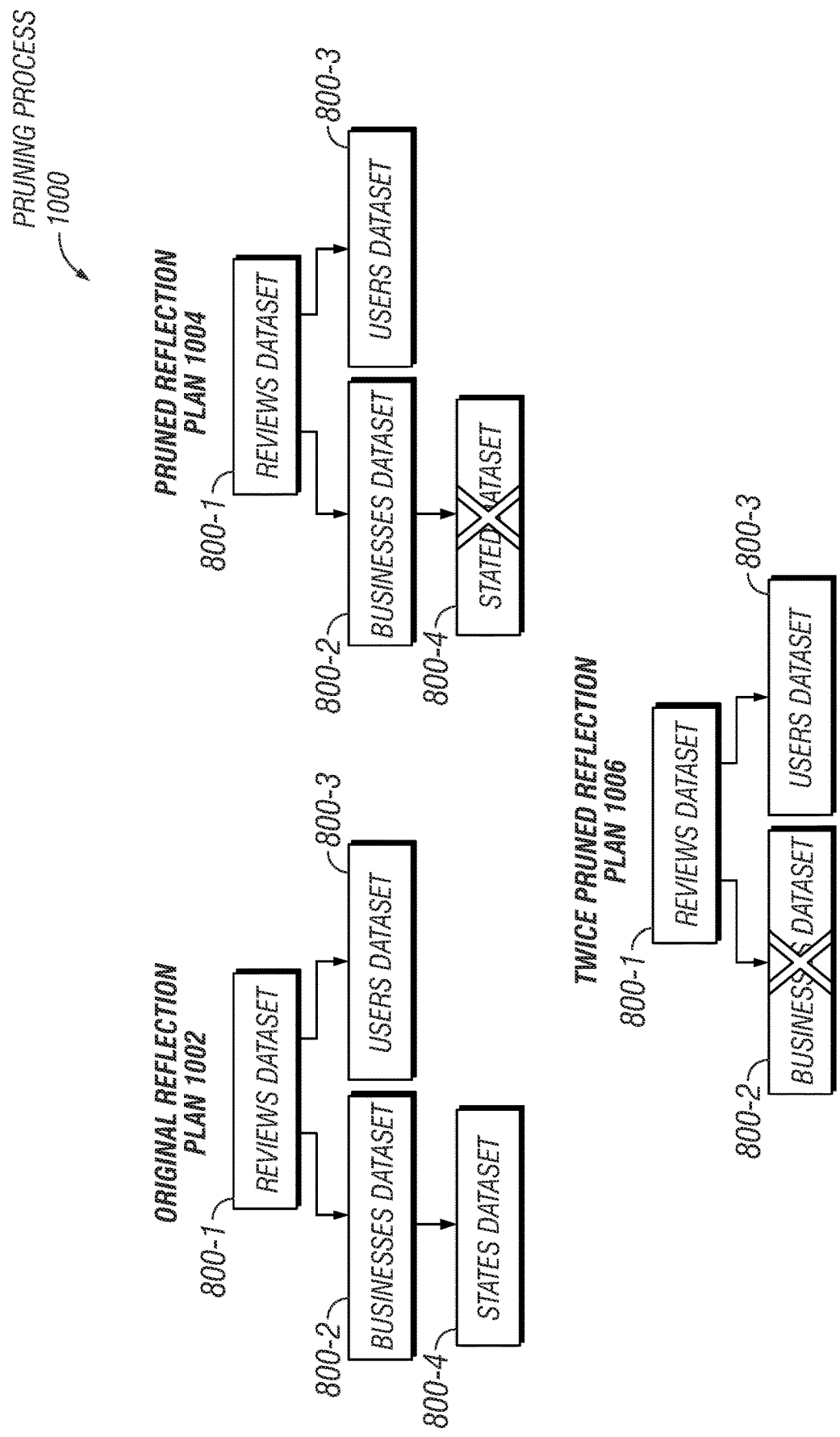
FIG. 10 is a block diagram that illustrates iterations of a pruning process applied to the starflake reflection of FIG. 8 according to some embodiments of the present disclosure.

For example, FIG. 10 is a block diagram that illustrates iterations of the pruning process applied to the four-way record-preserving join 802 of the starflake reflection of FIG. 8. The pruning process 1000 begins with the original reflection plan 1002 of the four-way record-preserving join 802 of the starflake reflection of FIG. 8 including the reviews dataset 800-1 and related businesses dataset 800-2, users dataset 800-3, and states dataset 800-4. The pruned reflection plan 1004 removes the states dataset 800-4. The twice pruned reflection plan 1006 further removes the businesses dataset 800-2 thereby leaving data of the reviews dataset 800-1 and related users dataset 800-3.

A person skilled in the art would understand the pruning process when considering that a record-preserving join is akin to an extended table structure and pruning effectively removes some of the columns of the extended table. For example, FIG. 11 illustrates the extended table of the four-way record-preserving join 802 subject to the pruning process described with respect to FIG. 10. As shown, the columns related to the businesses dataset 800-2 and states dataset 800-4 are removed, which leaves the data of users dataset 800-3 related to the reviews dataset 800-1.

Referring back to FIG. 9, in step 914, the data system determines whether the query plan can be modified to utilize the pruned starflake reflection, and whether that would reduce the resource utilization and computational cost of the query thereby accelerating query execution. If so, in step 916, the query plan is modified to read the pruned starflake reflection in lieu of reading a dataset stored in a data source thus accelerating query execution. On the other hand, if modifying the query plan with the pruned starflake reflection would not accelerate query execution, the query plan reads the dataset from the data source to obtain query results that satisfy the query. The optimizer continues to iterate through the starflake reflections stored in the relational cache to determine whether the query plan can be optimized with any starflake reflections to accelerate query execution.

In some instances, choosing a specific type of join is important to ensure that a join is record-preserving. For example, assume the states dataset 800-4 in the example of FIG. 8 only had a single record (e.g., only CA records and no NV records). In that case, an inner join between the businesses dataset 800-2 and states dataset 800-4 would result in one of the records in the reviews dataset 800-1 missing from the reflection. Consequently, the matching algorithm would not be able to prune the states dataset 800-4 or businesses dataset 800-2 from the four-way record-preserving join 802 of the starflake reflection of FIG. 8. For example, FIG. 12 illustrates the four-way record-preserving join of FIG. 8 with the only record of the table that has an NV state value. In this example, one way to address the aforementioned issue is to replace the inner join with a left outer join. By doing so, the record for business_id=3 in the businesses dataset 800-2 is preserved and along with it the record for review_id=4 in the reviews dataset 800-1.

In some embodiments, the optimizer of the data system can leverage starflake reflections that are based on outer joins in order to accelerate inner joins. The starflake reflection with an outer join can be utilized by the optimizer to accelerate a query with an inner join by applying a filter on top of the outer join to drop records in which the join key on one side is null. This is important because BI tools often default to constructing inner joins when users work with their visual join interfaces.

Prior to this disclosure, an optimizer had no way of ignoring some datasets in a join reflection. For example, accelerating a query that joins the datasets A, B, C, and D required a specific reflection that joins those four datasets. However, that reflection would not be useful for accelerating queries on a subset of the four datasets. Hence, the process was computationally prohibitive before the disclosed starflake reflections. For example, imagine an analytical use case involving one fact table and twenty different dimension tables. In order to accelerate queries on that fact table and an arbitrary combination of dimensions, the system would have to maintain over one million different reflections ($2^{20}$=1,048,576). However, with starflake reflections, only a single reflection is required, leading to a significant reduction in resource utilization and complexity. Specifically, the starflake reflection would have one fact table and twenty different dimension tables that can be pruned as necessary for a query plan.

There are many ways beyond starflake reflection matching in which collecting runtime statistics and information can improve the performance of the disclosed data system to operate intelligently. The runtime statistics can make the data system more effective at matching reflections, autonomously creating new reflections, optimizing queries, and recommending data transformations.

An example includes autonomously creating new reflections. When determining which reflections to autonomously create, it helps to understand the query workloads. That is, it helps to determine whether some fields are highly correlated. For example, when grouping on datasets A and B, the data system may determine if the total cardinality of the combination is closer to the multiple or maximum cardinality of the two fields. If fields are highly correlated, there is little additional cost to including all of them rather than just one when creating an aggregation reflection.

Another example includes optimizing queries. For example, join statistics can help choose the optimal join algorithm. When two datasets are joined for the first time, the data system may choose a suboptimal algorithm. But the next time that join executes, the data system would make a better choice. As another example, if all the values in a specific field are unique, a COUNT DISTINCT operation on that field is equivalent to the much less expensive COUNT operation.

Another example is recommending data transformations. For example, record-preserving joins are similar to lookup operations in spreadsheet applications. If a data system has previously observed a dataset being "extended" through record-preserving joins to other datasets, it could recommend those other datasets as possible lookups in a graphical user interface. In fact, it could recommend not only two-way joins, but also n-way joins involving multiple tables.

Computing System

Figure 13:
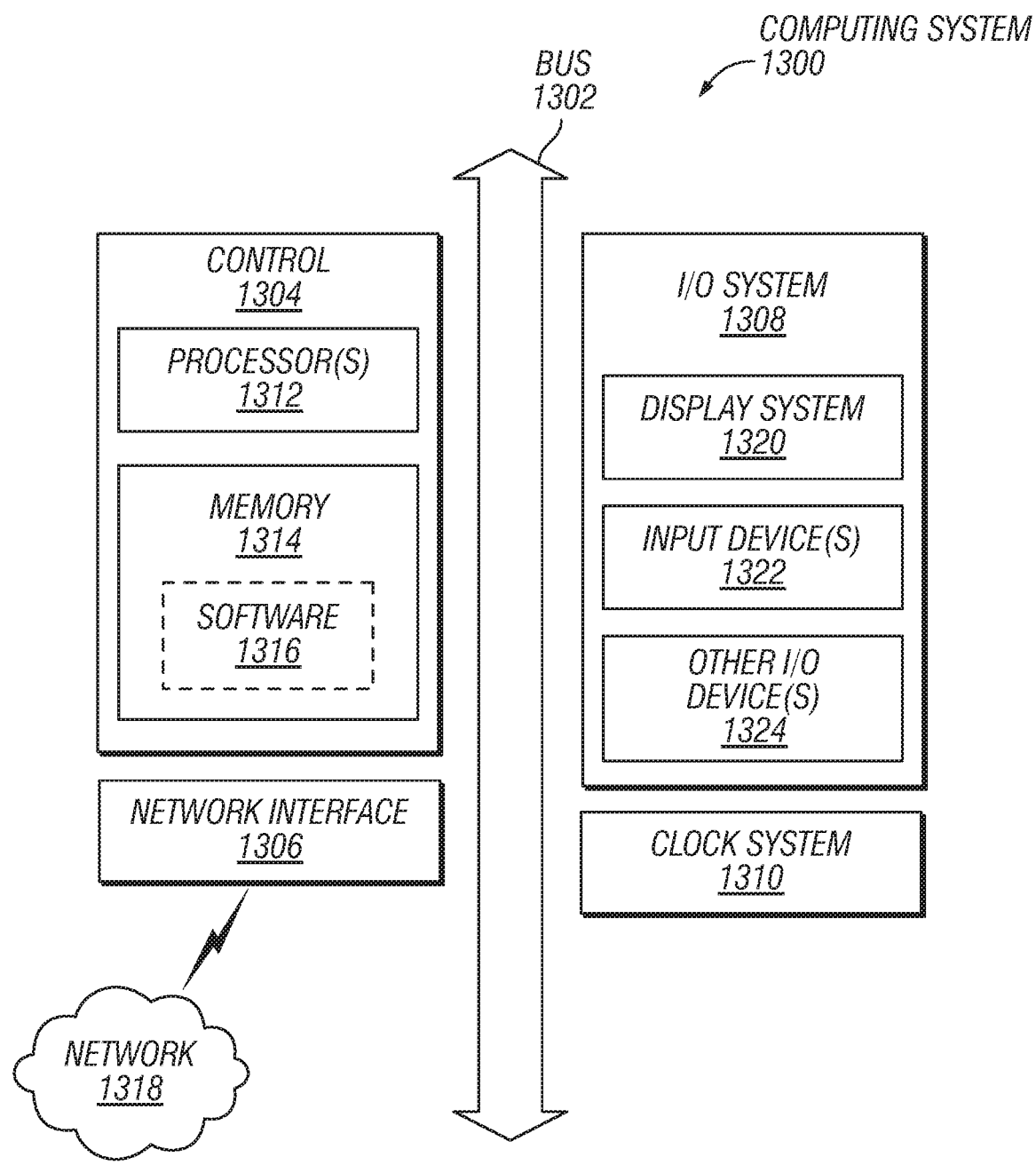
FIG. 13 is a diagrammatic representation of a computing system which can implement some embodiments of the present disclosure.

FIG. 13 is a diagrammatic representation of a computing system which can implement some embodiments of the present disclosure. Examples include any combination of the components of the data system 100. The computing system 1300 may be a general computer or a device specifically designed to carry out features of the disclosed technology. The computing system 1300 may be a network device, a system-on-chip (SoC), a single-board computer (SBC) system, a desktop or a laptop computer, a kiosk, a mainframe, a mesh of computer systems, a handheld mobile device, or combinations thereof.

The computing system 1300 may be a standalone device or part of a distributed system that spans multiple networks, locations, machines, or combinations thereof. In some embodiments, the computing system 1300 operates as a server computer (e.g., a network server computer running an analytic engine) or a mobile device (e.g., a user device of an enterprise network) in a networked environment, or a peer machine in a peer-to-peer system. In some embodiments, the computing system 1300 may perform one or more steps of the disclosed embodiments in real-time, near-real time, offline, by batch processing, or combinations thereof.

As shown, the computing system 1300 includes a bus 1302 operable to transfer data between hardware components. These components include a control 1304 (i.e., processing system), a network interface 1306, an Input/Output (I/O) system 1308, and a clock system 1310. The computing system 1300 may include other components not shown, nor further discussed for the sake of brevity. One having ordinary skill in the art will understand any hardware and software included but not shown in FIG. 13.

The control 1304 includes one or more processors 1312 (e.g., central processing units (CPUs), application-specific integrated circuits (ASICs), and/or field-programmable gate arrays (FPGAs)) and memory 1314 (which may include software 1316). The memory 1314 may include, for example, volatile memory such as random-access memory (RAM) and/or non-volatile memory such as read-only memory (ROM). The memory 1314 can be local, remote, or distributed.

A software program (e.g., software 1316), when referred to as "implemented in a computer-readable storage medium," includes computer-readable instructions stored in a memory (e.g., memory 1314). A processor (e.g., processor 1312) is "configured to execute a software program" when at least one value associated with the software program is stored in a register that is readable by the processor. In some embodiments, routines executed to implement the disclosed embodiments may be implemented as part of operating system (OS) software (e.g., MICROSOFT WINDOWS, Linux) or a specific software application, component, program, object, module, or sequence of instructions referred to as "computer programs."

As such, the computer programs typically comprise one or more instructions set at various times in various memory devices of a computer (e.g., computing system 1300) and which, when read and executed by at least one processor (e.g., processor 1312), cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., the memory 1314).

The network interface 1306 may include a modem or other interfaces (not shown) for coupling the computing system 1300 to other computers over the network 1318. The I/O system 1308 may operate to control various I/O devices, including peripheral devices such as a display system 1320

(e.g., a monitor or touch-sensitive display) and one or more input devices 1322 (e.g., a keyboard and/or pointing device). Other I/O devices 1324 may include, for example, a disk drive, printer, scanner, or the like. Lastly, the clock system 1310 controls a timer for use by the disclosed embodiments.

Operation of a memory device (e.g., memory 1314), such as a change in state from a binary one to a binary zero (or vice versa), may comprise a perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation, or a physical change or transformation in molecular structure, such as from crystalline to amorphous or vice versa.

Aspects of the disclosed embodiments may be described in terms of algorithms and symbolic representations of operations on data bits stored on memory. These algorithmic descriptions and symbolic representations generally include a sequence of operations leading to a desired result. The operations require physical manipulations of physical quantities. Usually, though not necessarily, these quantities take the form of electric or magnetic signals capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms, and that the disclosure applies equally regardless of the particular type of machine or computer-readable media used to actually effect the distribution.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

What is claimed is:

1. A method performed by a data system, the method comprising:
    automatically learning one or more relationships among a plurality of datasets stored at one or more data sources based on one or more of a query received by the data system or an observation of a data flow of the data system;
    generating an optimized data structure based on the learned relationships among the plurality of datasets, wherein the optimized data structure includes a record-preserving join of the plurality of datasets;
    receiving a new query for execution in accordance with a query plan;
    in response to receiving the new query, processing a plurality of optimized data structures including the optimized data structure by:
        skipping to a next optimized data structure when a current record-preserving join lacks any physical dataset in common with the query plan, and
        pruning a physical dataset of a current record-preserving join when the physical dataset is not referred to in the query plan; and
    determining that modifying the query plan to utilize the pruned record-preserving join would accelerate execution of the new query compared to the execution of the query plan; and
    modifying the query plan to obtain query results that satisfy the query by reading the optimized data structure in lieu of reading the plurality of datasets.

2. The method of claim 1, wherein the learned relationships among the plurality of datasets is based on a pattern of queries received by the data system such that the optimized data structure reflects the pattern of user queries.

3. The method of claim 1, wherein the learned relationships include a runtime statistic based on the data flow of the data system such that the optimized data structure reflects the runtime statistic.

4. The method of claim 1, wherein the learned relationships include a workload distribution based on the data flow of the data system such that the optimized data structure reflects the workload distribution.

5. The method of claim 1, wherein the optimized data structure includes an aggregation of the plurality of datasets.

6. The method of claim 1, wherein the optimized data structure includes a plurality of operators including a join of the plurality of datasets.

7. The method of claim 1, wherein the record-preserving join preserves a quantity of records equal to a quantity of records of one of the plurality of datasets.

8. The method of claim 1, wherein the plurality of datasets comprises a fact table and a plurality of dimension tables, and generating the optimized data structure comprises:
    preserving a quantity of all records of the fact table such that the record-preserving join has a corresponding quantity of records despite any of the plurality of dimension tables having a quantity of records different from the quantity of records of the fact table.

9. The method of claim 1, wherein automatically learning one or more relationships among the plurality of datasets comprises:
    autonomously determining a fact-dimension relationship among the plurality of datasets.

10. The method of claim 1, wherein the new query is a first query, the query plan is a first query plan, and the query results are first query results, the method further comprising:
    modifying a second query plan to obtain second query results that satisfy a second query by reading the optimized data structure in lieu of reading the plurality of datasets, wherein the first query plan has a different combination of datasets compared to the second query plan.

11. The method of claim 1, further comprising, prior to automatically learning one or more relationships among the plurality of datasets:
    processing the plurality of datasets in response to a plurality of queries.

12. The method of claim 1, wherein the query refers to at least one of the plurality of datasets that are contained in a plurality of data sources, the method further comprising:
    obtaining the query results without reading any of the plurality of datasets from the plurality of data sources.

13. The method of claim 1, wherein the query refers to at least one of the plurality of datasets that are contained in a plurality of data sources, the method further comprising:

obtaining the query results by reading at least some of the plurality of datasets from the plurality of data sources in addition to reading the optimized data structure.

14. The method of claim 1, further comprising, prior to modifying the query plan:
determining that the query can be accelerated based on the optimized data structure stored in a cache of the data system.

15. The method of claim 1, wherein learning the one or more relationships and generating the optimized data structure occurs at runtime of one or more query executions.

16. The method of claim 1, wherein modifying the query plan comprises:
expanding any virtual datasets derived from physical datasets or other virtual datasets so that the query plan refers only to physical datasets.

17. The method of claim 1, wherein all datasets of each record-preserving join that is not referred to in the query plan is pruned from each record-preserving join.

18. The method of claim 1, further comprising, prior to modifying the query plan:
storing the optimized data structure in a cache memory that stores a plurality of optimized data structures each including a record-preserving join.

19. The method of claim 1, further comprising, prior to modifying the query plan:
autonomously deciding to generate the optimized data structure.

20. The method of claim 19, wherein the decision to generate the optimized data structure is based on a determination that reading the optimized data structure in lieu of reading at least some dataset from a plurality of data sources improves processing of an expected workload.

21. The method of claim 1, wherein automatically learning one or more relationships among the plurality of datasets comprises:
identifying the join formed of a fact table and at least one-dimension table stored at one or more data sources; and
determining that the join is a record-preserving join when it has only one record for each record of the fact table.

22. A data system comprising:
a processor; and
memory containing instructions that, when executed by the processor, cause the data system to:
automatically learn one or more relationships among a plurality of datasets based on one or more of a query received by the data system or an observation of a data flow of the data system, the plurality of datasets being stored at one or more data sources;
generate an optimized data structure based on the learned relationships among the plurality of datasets, wherein the optimized data structure includes a record-preserving join of the plurality of datasets;
store the optimized data structure in a cache storing a plurality of optimized data structures;
receive a new query for execution in accordance with a query plan;
in response to receiving the new query, process a plurality of optimized data structures including the optimized data structure by causing the data system to:
skip to a next optimized data structure when a current record-preserving join lacks any physical dataset in common with the query plan, and
prune a physical dataset of a current record-preserving join when the physical dataset is not referred to in the query plan; and
determine that modifying the query plan to utilize the pruned record-preserving join would accelerate execution of the new query compared to the execution of the query plan; and
modify a query plan to obtain query results that satisfy a query by reading the optimized data structure in lieu of reading the plurality of datasets stored at the one or more data sources.

23. A data system comprising:
a processor; and
memory containing instructions that, when executed by the processor, cause the data system to:
identify a join formed of a fact table and a plurality of dimension tables stored at one or more data sources;
determine that the join is a record-preserving join when it has only one record for each record of the fact table;
generate an optimized data structure including the record-preserving join;
store the optimized data structure in a cache memory storing a plurality of optimized data structures; and
modify a query plan to obtain query results that satisfy a query by reading the optimized data structure in lieu of reading any of the fact table or the plurality of dimension tables stored at the one or more data sources.

24. The data system of claim 23 caused to:
autonomously decide to generate each optimized data structure.

25. A data system comprising:
a cache memory configured to store a plurality of optimized data structures that each include a record-preserving join,
wherein the record-preserving join is formed of a fact table and a plurality of dimension tables, and
wherein the record-preserving join includes a record for each record of the fact table; and
a processor configured to modify a query plan to obtain query results by reading at least some of the plurality of optimized data structures in lieu of reading data stored in a plurality of data sources.

26. The data system of claim 25, wherein the processor is further configured to prune any dataset from each record-preserving join that is not referred to in the query plan.

* * * * *